(12) United States Patent
Dulberg et al.

(10) Patent No.: US 12,077,034 B2
(45) Date of Patent: Sep. 3, 2024

(54) ATMOSPHERIC WATER GENERATOR AND DEHUMIDIFIER FOR VEHICLE

(71) Applicant: WATERGEN LTD., Petah Tiqwa (IL)

(72) Inventors: Sharon Dulberg, Beer Sheva (IL); Yanir Richard Blumenthal, Kfar Saba (IL); Moran Pery, Ramat Gan (IL); Guy Evgeni Chernin, Rosh Ha'ayin (IL); Chen Nechemia, Rehovot (IL); Ohad Berdugo, Tel-Aviv (IL)

(73) Assignee: WATERGEN LTD., Petach Tiqwa (IL)

( * ) Notice: Subject to any disclaimer, the term of this patent is extended or adjusted under 35 U.S.C. 154(b) by 291 days.

(21) Appl. No.: 17/431,885

(22) PCT Filed: Feb. 18, 2020

(86) PCT No.: PCT/IL2020/050179
§ 371 (c)(1),
(2) Date: Aug. 18, 2021

(87) PCT Pub. No.: WO2020/170243
PCT Pub. Date: Aug. 27, 2020

(65) Prior Publication Data
US 2022/0153092 A1 May 19, 2022

Related U.S. Application Data

(60) Provisional application No. 62/806,922, filed on Feb. 18, 2019.

(51) Int. Cl.
*B01D 5/00* (2006.01)
*B01D 53/26* (2006.01)
(Continued)

(52) U.S. Cl.
CPC ....... *B60H 1/32331* (2019.05); *B01D 5/0075* (2013.01); *B01D 5/009* (2013.01);
(Continued)

(58) Field of Classification Search
CPC .. B60H 1/32331; B01D 5/0075; B01D 5/009; B01D 53/265; B01D 1/0058; B01D 1/3227; E03B 3/28
See application file for complete search history.

(56) References Cited

U.S. PATENT DOCUMENTS

| 6,058,718 A | 5/2000 | Forsberg et al. |
| 2010/0025311 A1 | 2/2010 | Jones et al. |

(Continued)

FOREIGN PATENT DOCUMENTS

| CN | 101410263 A | 4/2009 |
| CN | 101821460 A | 9/2010 |

(Continued)

OTHER PUBLICATIONS

International Search Report of PCT Application No. PCT/IL2020/050179, mailed Jun. 11, 2020.

*Primary Examiner* — Elizabeth J Martin
(74) *Attorney, Agent, or Firm* — PEARL COHEN ZEDEK LATZER BARATZ LLP

(57) ABSTRACT

AWG system (102) installed on, or coupled to, an apparatus (100) such as a vehicle, which may either have (i) a heat emitting element 106 which may provide residual heat that is produced by the apparatus (100) to the manufacture, treatment or dispensing of the water (112) generated by the AWG (102); (ii) a power source which may provide power to the manufacture, treatment or dispensing of the water (112) generated by the AWG (102) or (iii) an element which may benefit from the water (112) or dehumidified air that is produced by the AWG (102).

11 Claims, 8 Drawing Sheets

(51) Int. Cl.
  B60H 1/00   (2006.01)
  B60H 1/32   (2006.01)
  C02F 1/04   (2023.01)
  E03B 3/28   (2006.01)

(52) U.S. Cl.
  CPC ........... B01D 53/265 (2013.01); B60H 1/005 (2013.01); B60H 1/3227 (2013.01); C02F 1/04 (2013.01); E03B 3/28 (2013.01); C02F 2201/008 (2013.01); C02F 2303/04 (2013.01)

(56) References Cited

U.S. PATENT DOCUMENTS

| | | |
|---|---|---|
| 2011/0048039 A1 | 3/2011 | Kohavi et al. |
| 2016/0238310 A1* | 8/2016 | Kim .................... B01F 23/2361 |
| 2018/0216319 A1* | 8/2018 | Dudar .................... B67D 7/76 |

FOREIGN PATENT DOCUMENTS

| | | |
|---|---|---|
| DE | 10 2018 101682 | 8/2018 |
| EP | 0 891 523 | 11/2005 |
| JP | S58-022617 | 2/1983 |
| WO | WO 2013/084077 | 6/2013 |

\* cited by examiner

FIG. 5
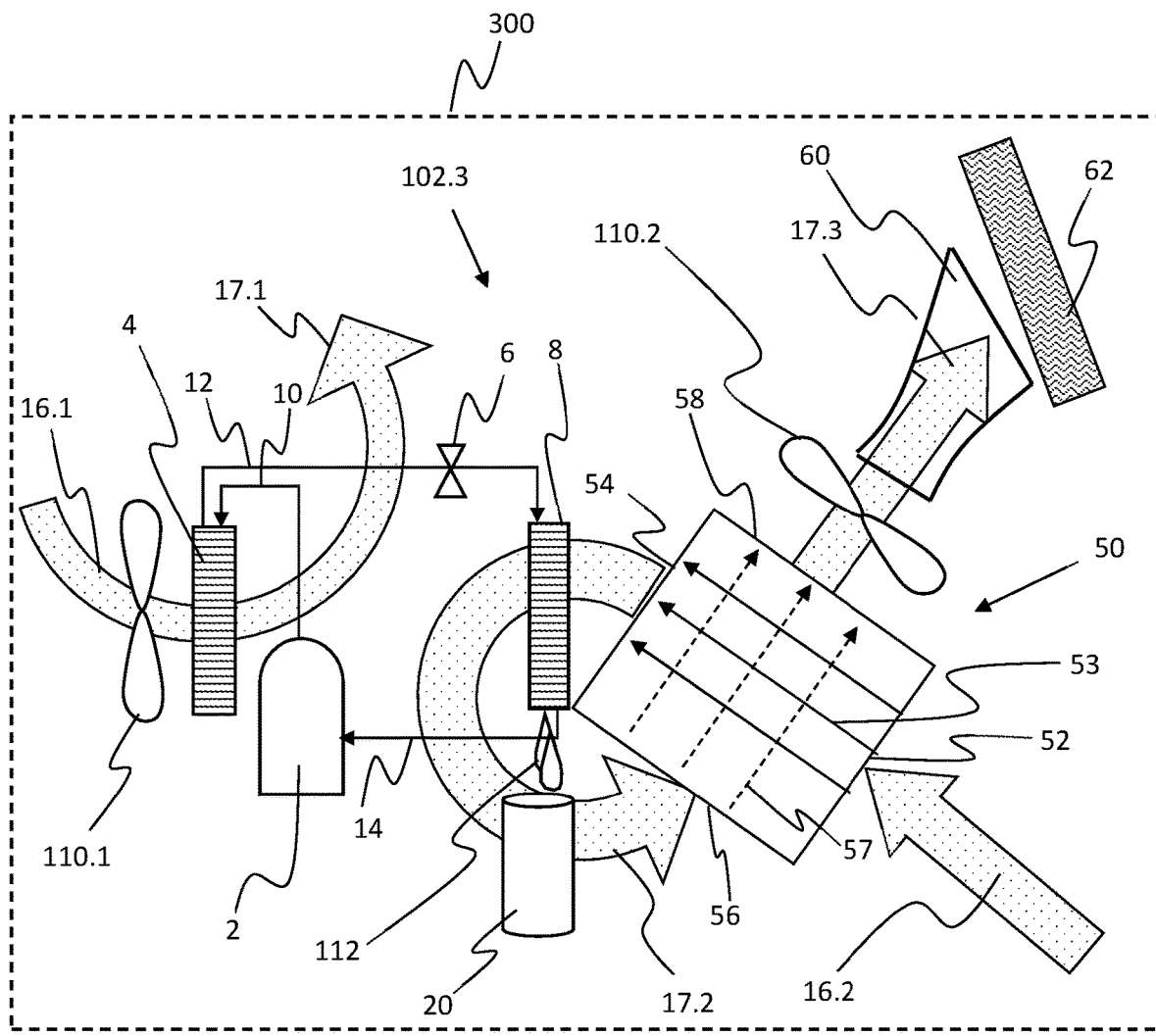
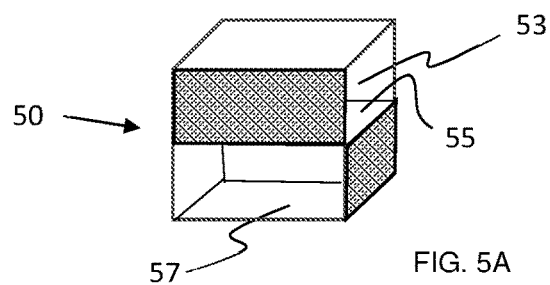
FIG. 5A

ATMOSPHERIC WATER GENERATOR AND DEHUMIDIFIER FOR VEHICLE

CROSS-REFERENCE TO RELATED APPLICATIONS

This application is a National Phase Application of PCT International Application No. PCT/IL2020/050179, International Filing Date Feb. 18, 2020, claiming benefit of U.S. Provisional Patent Application No. 62/806,922, filed Feb. 18, 2019, which is hereby incorporated by reference.

TECHNICAL FIELD

The present invention relates to the field atmospheric water generators and dehumidifiers. In particular, the invention relates to the field atmospheric water generators and dehumidifiers in vehicles.

BACKGROUND OF THE INVENTION

Extraction of water from air is well known and typically involves motivating air comprising humidity through an evaporator of a refrigeration cycle, which lowers the temperature of the air below its dew point, thereby causing humidity to condensate and water is thereby released from the carrying air. The water produced by this method, needs to be contained, treated and dispensed. Methods and systems to extract and provide on-demand water in vehicles such as water which are extracted from the air-conditioning system of the vehicle, are also known. Some publications describe ways to utilize heat produced by the vehicle for treating the extracted water. For example, see Korean Patent Application Publication No. 20080020175, U.S. Pat. No. 5,435,151. Other publications, such as U.S. Pat. No. 8,252,174 teach the use of the generated water for other applications in the vehicle.

However, the prior-art solutions still suffer from numerous short comings and there is a long felt need for improvements in order to make this vision more practical, energy saving and economical.

SUMMARY OF THE INVENTION

The object of the invention is to provide means for mutual benefit to an apparatus, such as a vehicle, installed with an atmospheric water generator (AWG), from the water and dry air it produces, and to the AWG from the residual heat or power produced by the apparatus.

The invention thus relates to an AWG system installed on, or coupled to, an apparatus which may either have (i) a heat emitting element which may provide residual heat that is produced by the apparatus to the manufacture, treatment or dispensing of the water generated by the AWG; (ii) a power source which may provide power to the manufacture, treatment or dispensing of the water generated by the AWG or (iii) an element which may benefit from the water or dehumidified air that is produced by the AWG. Such an apparatus may be a vehicle (e.g. a car, truck, recreational vehicle, train, ship, boat, airplane), an industrial machine, an agriculture machine, a solar panel unit, a timber heater in a timber drying plants and more.

For sake of simplicity, the description is focused on an AWG installed on a vehicle, but those having skill in the art will be able to adopt the invention also to other corresponding embodiments.

In a first aspect, the invention is directed to an AWG having a system which utilizes residual emitted heat from an apparatus comprising at least one heat producing element for heating water generated by the AWG. The AWG is to be installed in the apparatus or coupled thereto. The AWG comprises a refrigeration cycle adapted to condense humidity from the air into water condensate and a pasteurization circulation system adapted to circulate the water condensate and transfer heat from the heat producing element of the vehicle to the circulating water condensate such that the circulating water condensate is heated to a temperature and duration rendering it pasteurized and adapted to post-cool the pasteurized water condensate.

In some embodiments the apparatus is a vehicle.

In a second aspect, the invention provides an apparatus comprising the AWG system described above. In some embodiments, the apparatus comprising the AWG system is a vehicle.

In another aspect, the invention is directed to an AWG comprising a refrigeration cycle adapted to condense humidity from the air into water condensate, a control unit, a detachable receptacle such as a collection tank or a bottle adapted to receive water condensate generated and transferred by the refrigeration cycle, and a presence sensor adapted to sense the presence or absence of the detachable receptacle. The control unit is in communication with the presence sensor, and is designed to stop the transfer of water condensate to the detachable receptacle upon receiving a signal from the presence sensor of absence of the detachable receptacle, and to activate transfer of water condensate to the detachable receptacle upon receiving a signal from the presence sensor of presence of the detachable receptacle.

In another aspect, the invention is directed to an apparatus installed with the AWG comprising the detachable receptacle described above.

Another aspect of the invention is directed to an AWG system that is installed in an auxiliary apparatus or coupled thereto, adapted to provide the dried air emitted from the AWG, and/or water generated by the AWG to systems and modules of the auxiliary apparatus. The AWG includes a refrigeration cycle that is adapted to dehumidify relatively warm and humid incoming air into relatively dry and cold outgoing air, and coupled to at least one air-to-air heat exchanger adapted to pre-cool the incoming air and post-heat the outgoing air, by transferring het from the relatively cold outgoing air to the relatively hot incoming air, wherein the post-heated dry air is channeled to a module adapted to at least one of: a) provide warm dry air to a motor suction; b) dry a windshield; c) dry water condensation over the sensor; and d) expel humidity from a space (e.g. the passengers' compartment in a vehicle).

In some embodiments the apparatus that is provided with dry air from the AWG is a vehicle comprising at least one of: a motor, a windshield, side mirrors and a sensor that requires occasional washing or drying.

In some embodiments, the apparatus comprises at least one of a fuel cell and a sensor washer, and the AWG comprises a refrigeration cycle adapted to condense humidity from the air into water condensate, and a dispensing line adapted to provide water condensate to at least one of the fuel cell and the sensor washer.

Another aspect is directed to an apparatus installed with the AWG adapted to provide the apparatus dry air being relatively warm to the air leaving the refrigeration cycle. In some embodiments the AWG comprises a refrigeration cycle adapted to dehumidify relatively warm and humid incoming air into relatively dry and cold outgoing air, and coupled to at least one air-to-air heat exchanger adapted to pre-cool the incoming air and post-heat the outgoing air, wherein the post-heated dry air is channeled to a module adapted to at least one of: a) provide warm dry air to a motor suction; b) dry a windshield; c) dry water condensation over the sensor; and d) expel humidity from a space (e.g. the passengers' compartment in a vehicle).

Another aspect is directed to an apparatus comprising at least one of the fuel cell and the sensor washer and installed with an AWG comprising a refrigeration cycle adapted to condense humidity from the air into water condensate, and a dispensing line adapted to provide water condensate to at least one of the fuel cell and the sensor washer. In some embodiments the apparatus is a vehicle.

Yet another aspect of this invention is directed to an AWG installed in an apparatus comprising at least one power source, wherein the AWG comprises a phase change material (PCM) tank adapted to contain a PCM, and a refrigeration cycle powered by the apparatus' power source. The refrigeration cycle includes an evaporator accommodated in the PCM tank and adapted to absorb heat from PCM contained in the PCM tank, a first heat exchanger, a second heat exchanger, a pump, a blower, and a water condensate storage tank. When the refrigeration cycle is running, the evaporator is adapted to cool and at least partially solidify the PCM in the PCM tank. The pump is adapted to circulate cooled fluid from within the first heat exchanger to the second heat exchanger and heated fluid from the second heat exchanger to the first heat exchanger in a closed loop. The first heat exchanger is adapted to cool the circulating loop by transferring heat from the circulating fluid to the PCM in the PCM tank, the blower is adapted to blow an airflow, from outside the AWG, through the second heat exchanger, the second heat exchanger is adapted to transfer heat from the airflow to the fluid and to cool the air below its dew point, creating water condensation.

In another aspect, the invention is directed to AWG to be installed in an apparatus or coupled thereto, the AWG comprising a refrigeration cycle receiving power from a power source of the apparatus. The refrigeration cycle is adapted to chill an air stream and condense humidity therefrom into water condensate. The AWG further comprises a storage tank adapted to store the generated water condensate, a circulation line connected to the storage tank comprising a first heat exchanger adapted to heat the circulated water by the vehicle's heat source and a circulating pump adapted to circulate the water from the storage tank, through the first heat exchanger and from the first heat exchanger to the storage tank, and a dispensing line comprising a pump, a second heat exchanger and a spout, connected at one end to the water condensate storage tank and the spout located at the second end, the second heat exchanger located between the water condensation storage tank and the spout and a PCM compartment adapted to accommodate a PCM. At least a portion of a second evaporator and at least a portion of the second heat exchanger of the dispensing line comprise a second evaporator and a second heat exchanger.

The second evaporator is connected to the refrigeration cycle, located downstream an expansion valve at a location allowing it to be in contact with the PCM in the PCM compartment, and adapted to cool and solidify the PCM, the dispensing pump in the dispensing line is adapted to motivate water from the storage tank, to the second heat exchanger, then to the spout, the second heat exchanger being located at a location allowing it to be in contact with the PCM in the PCM compartment, and adapted to cool the water by allowing heat transfer from the water to the PCM.

In another aspect, the invention is directed to an apparatus comprising at least one power source, and installed with or coupled to any one of the AWGs comprising a PCM tank described above. In some embodiments the apparatus is a vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5A is an isometric view of the air-to-air heat exchanger in the AWG depicted in FIG. 5.

Figure 1:
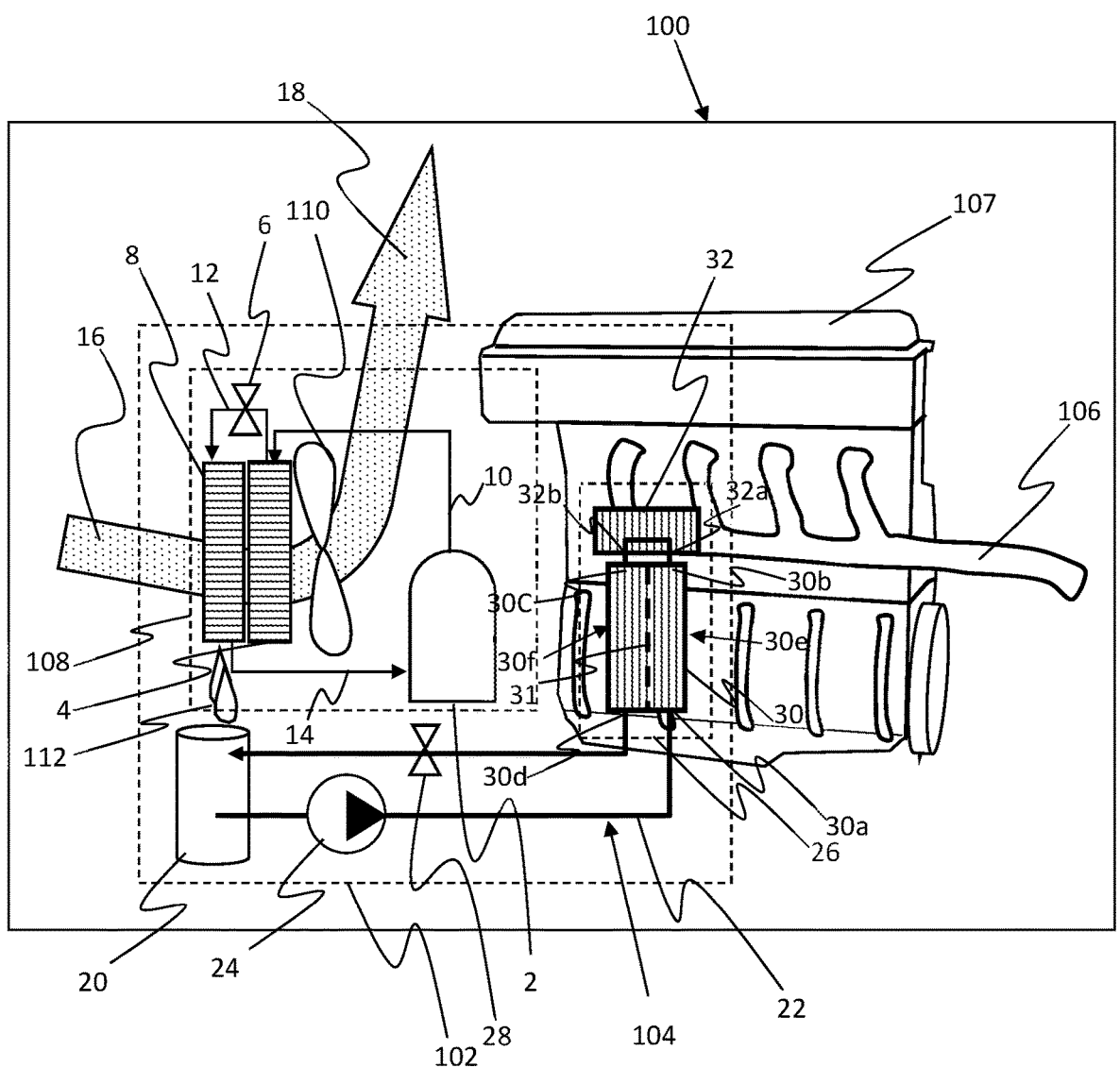
FIG. 1 is a block diagram of an AWG installed in a heat producing apparatus according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is made to FIG. 1 depicting an embodiment of the present invention, namely an apparatus 100 comprising an AWG 102 having a system 104 which utilizes residual heat from a heat emitting component 106 of the apparatus 100 in which the AWG 102 is installed. In the example depicted in FIG. 1 the system 104 can be a pasteurizing system 104 which utilizes heat generated by an exhaust manifold 106 of a vehicle 100 for pasteurization of the generated water 112.

It is noted that FIG. 1 and the figures to come show only the relevant components of the heat producing apparatus (e.g. a vehicle) in each figure, and that the apparatus comprises many other components to allow it to function, but for the sake of clarity and simplicity, only the relevant components to the invention are shown.

The term "residual heat" refers herein to heat emitted by a component of the apparatus which is not converted to work by the apparatus.

The AWG 102 further comprises a water generating refrigeration cycle 108 (hereinafter "refrigeration cycle"), and a blower 110 for motivating an airflow through the refrigeration cycle 108. The refrigeration cycle 108 is adapted to condense humidity from the air into water condensate 112. In some embodiments, the refrigeration cycle 108, can be the refrigeration cycle of the air-conditioning system of the vehicle 100. The refrigeration cycle 108 comprises a compressor 2, condenser 4, evaporator expansion means 6, evaporator 8, and a set of refrigerant tubes 10, 12 and 14. When the AWG 102 operates to generate water condensate, a refrigerant gas is compressed in the compressor 2. The compressed refrigerant gas travels in refrigerant line 10 to the condenser 4 where it condenses into a liquid. The condensed liquid travels out of condenser 4 through refrigerant line 12 and reaches an expansion means 6 (e.g. capillary tube, expansion valve), where it turns into a liquid-gas cold mixture and then enters evaporator 8 where it evaporates and chills the evaporator 8 below the dew point of an incoming air flow 16, for condensation of humidity in airflow 16 into water condensate 112. After exiting the evaporator 8, the refrigerant, which at this point is in gas phase, is transferred through a suction line 14 back to the compressor 2 to complete the refrigeration cycle.

A blower 110 is located in the AWG 102 to be able to motivate an inlet airflow 16 to enter the AWG 102. The airflow 16 may pass through an air filter (not shown) to remove particles and optionally to absorb chemical contaminants. The airflow 16 then flows through the evaporator 8, where the temperature of the airflow 16 is reduced below its dew point, shelling off some moisture which condenses into water droplets 112. The relatively cooled and dry airflow further flows through the condenser 4, in which it is being heated and then flows out of the AWG 102 as an outlet airflow 18. In the depicted embodiment, the blower 110 is located downstream the condenser. In some embodiments, the blower 110 may be located in any suitable position along the flow line between an air entry to the AWG 102 and an air exit from the AWG 102.

The water droplets (the water condensate) 112 that are generated are collected gravitationally into a water condensate storage tank 20 (also referred herein as "storage tank"). In some embodiments, the water is first collected in a water sump. In some embodiments, the sump is hydraulically connected to the storage tank 20.

The water pasteurization system 104 comprises a pasteurization circulation line 22 comprising a water pump 24, a heat exchanger 26 and a pressure reducing device 28. The circulation line 22 is connected at one end to a storage tank outlet. In some embodiments, the circulation line 22 is connected at another end to a storage tank inlet. The water pump 24 is adapted to draw water from the storage tank 20, and circulate the water through the circulation line 22. The circulation line 22 passes through the heat exchanger 26, which is designed to allow heat transfer from a heat generating element of the vehicle such as the exhaust manifold 106 or the engine 107. Residual heat from other heat generating elements such as the brakes (not shown) system or the radiator (not shown) of the engine 107, may also be used by coupling the heat exchanger 26 to one or more of these other heat generating elements. The heat exchanger 26 is designed to allow post-cooling of the hot water before it is directed to exit the pasteurization system. In some embodiments, such as the one depicted in FIG. 1, the circulation line ends at the storage tank 20 from where the water is drawn to complete a closed cycle. In some embodiments, the circulation line 22 ends at separate container comprising only pasteurized water. In some embodiments the separate container has an outlet which connects to the circulation line upstream the heat exchanger such that the pasteurized water which is stored in the separate container is periodically re-pasteurized.

When the water pasteurization system operates, the water drawn from the storage tank 20 is directed to the heat exchanger 26. The heat exchanger 26 is designed to bring the water temperature high enough and long enough to deactivate pathogens such as bacteria, fungi and viruses, and then to reduce the water temperature as much as possible so the temperature of the water that exit the pasteurization line (and returns to the storage tank or distributed to the user) is close as possible to consumable temperature, preferably ambient temperature. To this end, the heat exchanger 26 may comprise a first portion 30 and a second portion 32. The first portion 30 is a pre-heating/post-cooling portion and the second portion 32 is a pasteurization portion. The water which arrives from the storage tank 20 to the first side of the first portion 30 is pre-heated by hot water which exit the second portion 32 of the heat exchanger 26 and flows in the second side of the first portion 30. Hot water exiting the second portion (the pasteurization portion) 32 is post-cooled by the water flowing in the first side of the first portion 30. The first and second sides of the first portion 30 are thus interchangeably termed herein as the pre-heating and post-cooling sides of the first portion, respectively.

The pre-heated water that exits the pre-heating side of the first portion 30 arrives to the second pasteurization portion 32 of the heat exchanger 26. The pasteurization portion 32 is in contact with the heat generating element of the vehicle 100—in the depicted embodiment, the heat generating element 106 which provides residual heat to the pasteurization portion 32 is an exhaust manifold 106.

The first portion 30 of the heat exchanger 26 has two sides 30e, 30f separated by a barrier 31, each side having an inlet (30a and 30c, respectively) and an outlet (30b and 30d, respectively) through which the pasteurization water line 22a passes. The barrier 31 is made such as to prevent from the water in each side 30e/30f to mix with water in the other side 30f/30e, but allows heat to transfer from water in one side 30f to water in the other side 30e. In some embodiments, each of the sides 30e/30f may be a set of multiple compartments having multiple entries to maximize the interface between the two sides 30e, 30f for optimal heat transfer. In some embodiments, the first portion is a cross flow heat exchanger, such as a plates heat exchanger. In some embodiments, the heat exchanger is a counter-flow heat exchanger such as plates or tubular heat exchanger.

The second portion 32 of the heat exchanger 26 has an inlet 32a and an outlet 32b and is in contact with the heat producing element 106/107 of the vehicle 100. In some embodiments, the second portion 32 has a wall that is closely attached to the outer wall of the heat emitting element 106 of the vehicle 100. In some embodiments, the second portion 32 is embedded in the wall of the heat emitting element 106. The length of the second portion may be designed to allow the water flowing in the second portion sufficient time to reach a desired temperature and remain in that temperature (holding time) in order to achieve pasteurization of the water before it is post-cooled in the second side of the first portion 30. In some embodiments the water meets high temperature short time (HTST) pasteurization standards, for example at least 72° C. for at least 15 seconds. See other optional temperature and corresponding holding times for HTST pasteurization at Pennsylvania Code Title 7 § 59.216. In some embodiments, higher-heat, shorter-time (HHST) pasteurization standards are met, for example 89° C. for 1 second. In some embodiments, the second portion is a tube complying with holding tube standards of HTST pasteurization (e.g. the tubing is designed such that the simultaneous temperature difference between the hottest and coldest water in any cross section of flow at any time during the holding period will not be greater than 0.5° C.). In some embodiments, the second portion is fixated to the heat emitting element 106 of the vehicle 100 in order to assure full contact at all times between the second portion 32 and the heat emitting element 106.

In some embodiments, the pasteurization system 104 further comprises a pressure switch 28, such that the water at highest temperature is kept under a pressure higher than the saturation vapor pressure of the water in that temperature to keep the water in a liquid phase Pasteurized water exiting the second (pasteurizing) portion of the heat exchanger is directed to the post cooling side of the first (pre-heating/post-cooling) portion 30 of the heat exchanger 26. The post-cooling of the pasteurized water in the pre-heating/post-cooling portion 30 lowers the temperature of the water at the exit point of the post-cooling side to a lukewarm temperature between that of the incoming water entering the pre-heating side of the first portion of the heat exchanger 30 and the pasteurization temperature. Usually, the temperature of the water circulating in the pasteurization line 22 before entering the pre-heating side of the first portion of the heat exchanger is similar to the temperature of the water in the storage tank 20. The temperature of the water in the storage tank 20 in this embodiments is between the dew point temperature and the ambient temperature. Therefore, as the water flowing in the post-cooling side of the first portion 30 of the heat exchanger 26 exchanges heat with water arriving from the storage tank and flowing in the pre-heating side, then the temperature of the water exiting the post-cooling side is between the pasteurization temperature and a temperature between the dew point and ambient. In some embodiments, the temperature of the water exiting the post cooling side of the first portion is approximately an average the aforementioned temperatures. The term "approximately" in this context means a deviation of up to 5° C. In some embodiments, it is closer to the temperature of the water exiting the storage tank—this can be obtained by designing the first portion of the heat exchanger appropriately. For example, the pre-heating portion of the heat exchanger may have a high ratio between the volumes of the pre-heating and post-cooling chambers (e.g. having a pre-heating tubing with a large diameter and a post-heating with tubing with a smaller diameter), and/or by designing the post-cooling pathway to be longer than the pre-heating pathway.

In some embodiments, the heat exchanger 26 is a tubular heat exchanger, in which the first and second portions are integral parts of the same heat exchanger. In some embodiments the first and second portions of the heat exchanger 26 may be physically apart.

A pressure reducing device 28 located downstream the post-cooling side of the second portion 32 of the heat exchanger 26 reduces the fluid pressure to match the pressure in the storage tank 20. The pressure-reducing device 28 may be either a restrictor, pressure release valve or any other device that performs alike. In some embodiments, the pressure reducing device is not necessary, especially when the pasteurization is done bellow the boiling temperature of the water.

The water that completes the pasteurization cycle (the treated water) is thus pasteurized post-cooled water having a temperature close to the temperature of the water in the storage tank. The treated water is characterized by having reduced levels of active pathogens (e.g. bacteria, fungi and viruses). In some embodiments, the treated water is essentially free of active pathogens (e.g. have a negligible amount of active pathogens being for example below standard thresholds). In some embodiments, the treatment reduces the level of pathogens by three orders of magnitude, in some embodiments by five orders of magnitude.

In some embodiments the water in the storage tank is continuously circulated in the pasteurization cycle, and in some embodiments, periodically—for example, for 5 minutes every 30 minutes, or for an hour once a day. To this end a control unit installed with a programmed module may follow a corresponding logic to activate or deactivate the pasteurization cycle by turning the pump 24 on and off, accordingly. The term "control unit" refers to a component that controls and monitors the device operation. It may include integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The control unit commonly includes a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory.

Figure 2:
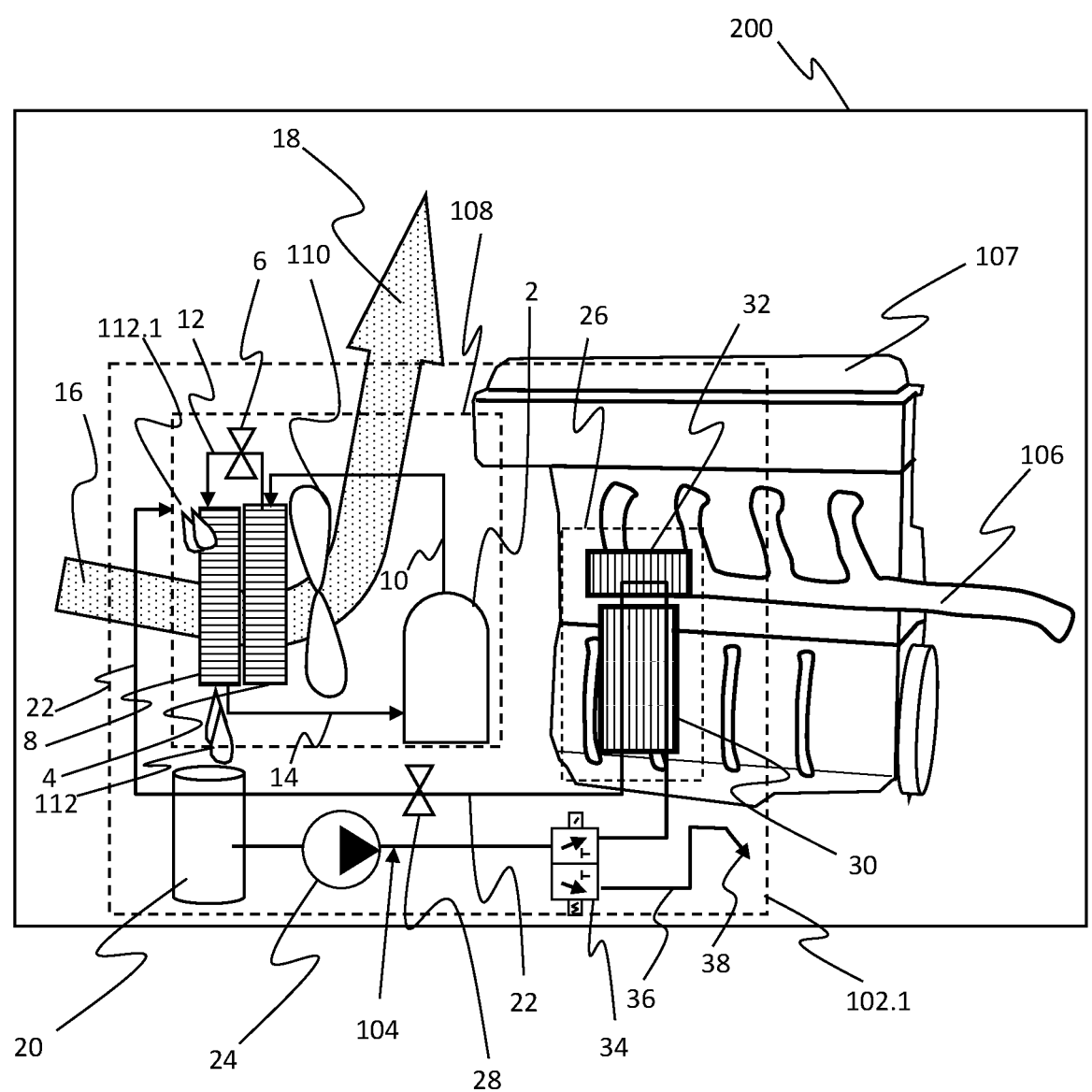
FIG. 2 is a block diagram of an AWG installed in a heat producing apparatus according to an embodiment of the present invention.

Reference is now made to FIG. 2 depicting an embodiment of the present invention namely an apparatus 200 comprising an AWG 102.1 having a system 104 utilizing residual heat from a heat emitting component 106 of the apparatus 200 in which the AWG 102.1 is installed. Components which are the same as those corresponding parts in FIG. 1 are denoted by the same reference numerals, and a description thereof will be omitted but should be construed as being identical.

AWG 102.1 is identical to AWG 102 except for having the following two optional features: (i) a mechanism for chilling the pasteurized water 112.1 using the evaporator 8 of the water generating refrigeration cycle 108 and (ii) having a valve 34 with at least two states: a first state for diverting water condensate to the pasteurization cycle, and a second state for diverting water condensate to a dispensing line or other utility line(s).

To this end the pasteurization line 22 is designed to end in proximity to the evaporator 8 and drop water exiting on the (cold) evaporator 8 and recollected in the storage tank 20, affecting further chilling of the pasteurized water 112.1 before it returns to the storage tank 20.

A bidirectional valve 34 is disposed on the pasteurization line 22 downstream the water pump 24 and upstream the heat exchanger 26, and is connected to an additional water line 36. In the depicted embodiment, the bidirectional valve 34 has a first state in which it directs the water to continue flowing in the pasteurization line 22 towards the heat exchanger 26. In a second state, the bidirectional valve 34 directs the water flow to a dispensing line 36 ending with a dispensing outlet spout 38. In other embodiments, a multi-directional valve (i.e. tri-directional and above) is disposed on the pasteurization line 22 having an additional state to the two mentioned above where water is directed to a line supplying water to one of the systems of the vehicle such as the windshield washer reservoir, a fuel battery or for washing a sensor.

In some embodiments the AWG 102.1 may comprise another bidirectional valve disposed upstream bidirectional valve 34 having a state for bypassing the heat exchanger 26 of the pasteurization cycle 22 and direct the water to the pasteurization line outlet, to enable the circulating water to be cooled by the evaporator 8 without being pasteurized.

The bidirectional valve 34 can be operated manually and/or by a control unit (not shown) installed with a designated programmed module. The control unit can be in communication with the bidirectional (or multidirectional) valve 34, optionally with a button on a human machine interface for demanding drinking water by a user and optionally with other sensors indicating need for supplying water. The control unit may for example activate the bidirectional valve 34 in response to a sensor detecting the presence of a cup ready to be filled with water. In another embodiment, when the apparatus in which the AWG is installed is a vehicle, the control unit can activate the bidirectional valve 34 (or multidirectional valve) when receiving an indication that the water level in a windshield washer reservoir is below a predetermined threshold level. In some embodiments it may respond to activation of the windshield washer pump by activating the bidirectional valve 34 (or multidirectional valve) to direct water to a supply line connected to the windshield washer pump. In some embodiments, directing the water from the storage tank to several lines is done by multiple pumps, located in adequate locations, and the directional valve may not be required. In some embodiments it may activate the bidirectional valve 34 (or multidirectional valve) to direct water to a supply line for filing a bottle, or another type of detachable receptacle such as a carboy, in response to an indication from a presence sensor (e.g. a proximity sensor) of presence of a detachable receptacle such as a water tank or a drinking bottle.

Figure 3:
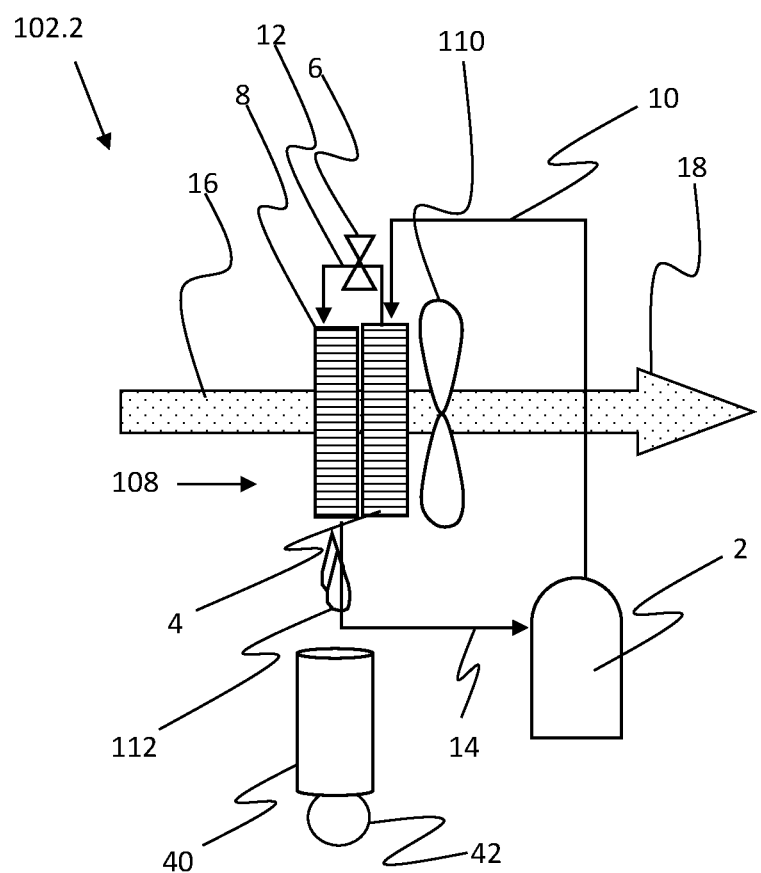
FIG. 3 is a block diagram of an AWG coupled to a presence sensor for sensing the presence of a detachable receptacle according to an embodiment of the present invention.

In this connection, reference is now made to FIG. 3 depicting an embodiment of another aspect of the present invention, namely an AWG 102.2 comprising a detachable receptacle 40, a presence sensor 42 and a control unit (not shown) installed with a programmed module. The AWG 102.2 is designed to fill the detachable receptacle 40 until it is full and to stop filling it when the detachable receptacle is taken away. Components which are the same as corresponding components in FIG. 1 are denoted by the same reference numerals, and a description thereof will be omitted but should be construed as being identical except otherwise noted.

A detachable receptacle 40 in a form of a bottle is placed in a bottle holder and is adapted to be filled by the water condensate 112 generated by the evaporator 8 of the refrigeration cycle 106. A presence sensor 42 which may be located in the vicinity of the bottle holder (not shown) is capable of detecting the presence of the detachable receptacle 40. For example, the presence detector may be located on the bottle holder. In some embodiments, the presence sensor may be selected from a proximity sensor, weight sensor, touch switch, and an occupancy sensor.

The presence sensor 42 is communication with a control unit installed with a programmed module, and provides an indication to the control unit regarding the presence or absence of the detachable receptacle 40. The control unit, in response to the indication received from the presence sensor 42, activates or deactivates a filling mechanism of the detachable receptacle. In some embodiments, the activation of the filling mechanism corresponds to arrest the manufacturing of water by the refrigeration cycle 108. In some embodiments, the deactivation corresponds to diversion of the water that is produced to a water storage or to another detachable receptacle that is present in a different location. In some embodiments, in response to an indication from the sensor 42 of absence of the detachable receptacle 40, the control unit switches the state of the bidirectional valve 34 to divert water to the pasteurization cycle 22. In some embodiments, the detachable receptacle 40 is positioned at the end of the dispensing line 36 (shown in FIG. 2) and connected to the outlet spout 38 (shown in FIG. 2) at the end of the dispensing line 36. In the response to an indication of presence or absence of the detachable receptacle 40, the control unit may open and close the spout 38, respectively. The control unit also may close the outlet spout 38 upon indication that the bottle is filled with water.

In some embodiments, the water generated by the AWG 102.2 is directly collected by the detachable receptacle 40, i.e. the storage tank 20 is equivalent in these embodiments to the detachable receptacle 40. In embodiments where the detachable receptacle is a personal drinking bottle, and the storage tank is replaced by the personal drinking bottle, the pasteurization cycle 22 is only optional. In some embodiments, with reference to FIG. 1, the pasteurization cycle 22 is connected at one end to a funnel which collects water condensate dripping from the evaporator 8 and feeds it to the pasteurization cycle 22, and at the other end it is connected to a dispensing line ending with an outlet spout to which the detachable receptacle is connected.

Figure 4:
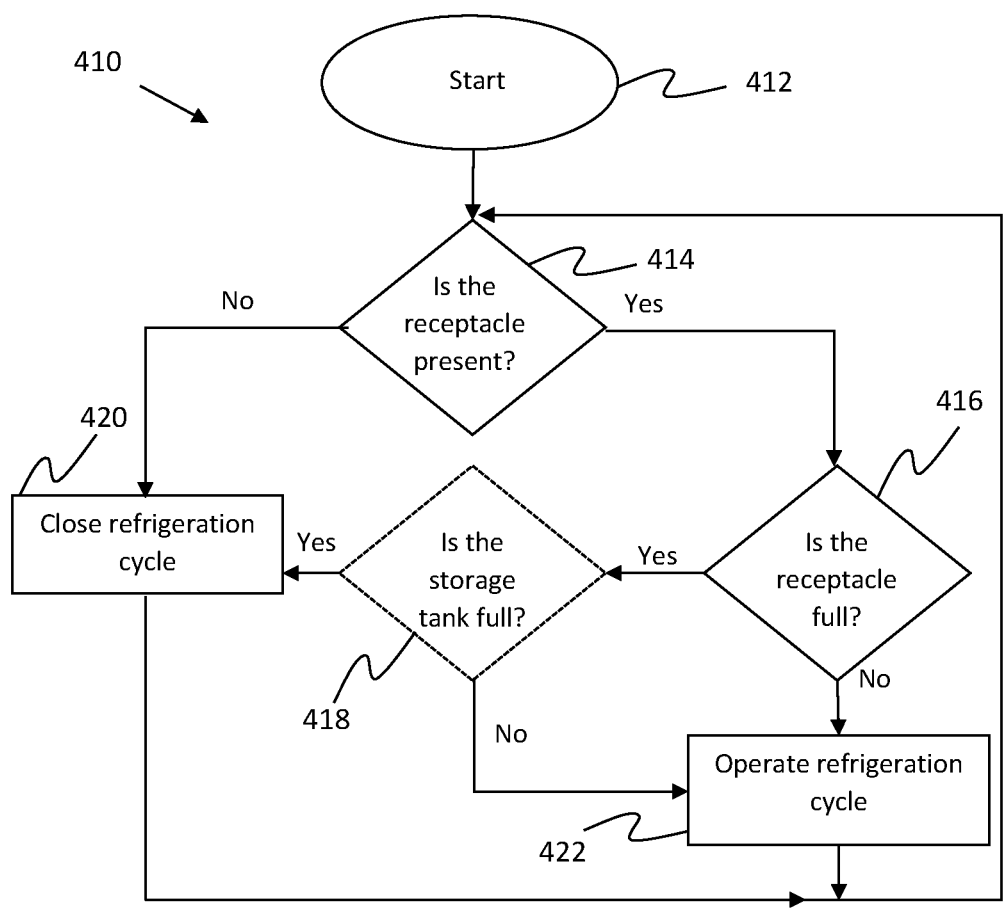
FIG. 4 is a flow chart depicting a method for operating the AWG coupled to a presence sensor for sensing the presence of a detachable receptacle according to embodiments of the invention.

Reference is now made to FIG. 4 describing the logic of operation of the AWG 102.2 by the control unit in response to indications from the presence detector 42.

Algorithm 410 relates to an AWG comprising a control unit installed with a water management module that follows the algorithm 410, a detachable receptacle 40, a presence detector 42 and a sensor for indicating whether the detachable receptacle is full or not (i.e. the water level in the detachable receptacle is lower than a predefined level). In step 412 the logic starts while the refrigeration cycle 108 of AWG 102.2 is off. Conditioning step 414, describes a checkout to conclude whether or not the detachable receptacle 40 is present in the detachable receptacle compartment (e.g. a bottle holder). If an indication is received from the presence sensor 42 that the detachable receptacle is present, then the decision is YES, and the logic continues to conditioning step 416. If an indication is received from the presence sensor 42 that the detachable receptacle is absent, then the decision is NO, and the refrigeration cycle is stopped (step 420).

Conditioning step 416 describes a checkout to conclude whether or not the detachable receptacle 40 is full (i.e. the water level in the detachable receptacle is at the predefined threshold level). The indication is provided by a detector enabled to determine the level of water in the detachable receptacle 40. If an indication is received from said detector that the bottle is not full (i.e. the water level in the detachable receptacle 40 did not reach the predefined threshold level) then the answer is NO, and the refrigeration cycle 108 is operated to generate water (step 422). If an indication is received from said detector that the detachable receptacle is full then the answer is YES. In embodiments wherein the water generated by the AWG is used to fill the detachable receptacle 40 directly without a storage tank 20 then the refrigeration cycle 108 is stopped (step 420). In embodiments wherein the AWG has a storage tank 20 then a positive answer in conditional step 416 is followed by another conditional step 418.

Conditional step 418, describes a checkout to conclude whether or not the storage tank 20 is full. If an indication is received from a detector capable of measuring the water level in the storage tank 20 that the water level is at or above a predefined threshold level then the answer is YES and the refrigeration cycle 108 is stopped (step 420). If an indication is received from said detector that the water level in the storage tank 20 is below a predefined threshold level then the answer is NO and the refrigeration cycle 108 is operated (step 422). If an indication is received from said detector that the detachable receptacle 38 is not full then the answer is NO and the refrigeration cycle is operated to produce water.

According to another aspect the invention refers to a method following the steps of algorithm 410.

The AWG 102.2 can be installed in any one of the apparatuses described in this invention but may also be a standalone apparatus, for example an AWG for domestic use, which provides an option to obtain a personal use bottle filled with water generated from the atmosphere which a user can take before leaving the house.

In another aspect, the invention provides an AWG to be installed in an apparatus such as a vehicle, adapted to provide warm and dry air to the apparatus for one or more model of the apparatus which may benefit from a supply of dry air. The warm and dry air provided to the apparatus by the AWG is warm relatively to the cold air which leaves the refrigeration cycle after the encounter with the evaporator. Warm dry air is more efficient for drying than cold dry air, which is obtained from a common A/C system of a vehicle. The AWG according to the invention comprises a refrigeration cycle adapted to dehumidify incoming relatively warm and humid air into outgoing relatively dry and cold air (the incoming air is warm and humid relatively to the outgoing air, and vice versa—the outgoing air is cold and dry relatively to the incoming air) and coupled to at least one air-to-air heat exchanger adapted to pre-cool the incoming air and post-heat the outgoing air by transferring heat from the incoming air to the outgoing air. The post-heated air which exits the air-to-air heat exchanger is channeled to a module adapted to provide the dry air to an application which uses dry air. In a vehicle the module may, for example, a) provide dry air to the motor suction; b) dry the windshield; c) dry water condensation over the sensor; and/or d) expel the humidity of the passengers' compartment.

Reference is now made to FIG. 5 providing an exemplary embodiment to this aspect of the invention. Components which are the same as those corresponding parts in FIGS. 1 to 3 are denoted by the same reference numerals, and a description thereof will be omitted but should be construed as being identical. The AWG 102.3 comprises two blowers, namely 110.1 and 110.2. The first blower 110.1 can motivate an inlet air-flow 16.1 through the condenser 4, in order to chill the condenser 4 and exit as an outlet airflow 17.1. The blower 110.1 can be replaced by a fan, and in some embodiments, by one of the fans of the vehicle 300.

The second blower 110.2 can also be one of the fans of the vehicle. The blower 110.2 can motivate inlet air-flow 16.2 being relatively warm and humid (relative to airflow 17.2) through a first inlet 52 of a first side 53 of an air-to air heat exchanger 50 where the warm and humid inlet air-flow 16.2 is pre-cooled by transferring heat to a second airflow 17.2 being relatively cold and dehumidified (relative to airflow 16.2), which exits the evaporator 8 of the refrigeration cycle and flows through a second inlet 56 in a second side 57 of air-to-air heat exchanger 50 that is separated from the first side by a barrier 55. The relatively warm and humid airflow 16.2 exits the air-to-air first air outlet 54 and reaches the evaporator 8, which is designed to be colder than the dew point of airflow 16.2 with the aid of the refrigerant of the refrigeration cycle, where it is dehumidified as at least some of the humidity of the airflow 16.2 is condensed into water. Airflow 17.2 exiting the evaporator is dryer and colder than air entering the evaporator. Due to the heat transfer with the relatively cold airflow 17.2, the airflow 16.2 arrives at the evaporator 8 at a lower temperature, closer to its dew point which saves energy and increases the yield of the dehumidification process. The water that is condensed in this process 112 may be disposed. In some embodiments the water condensate 112 is collected in a storage tank 20 and treated for various possible uses thereafter. The relatively cold and dehumidified airflow 17.2 reenters a second side of the air-to-air heat exchanger 50 following a duct designed for this purpose (see FIG. 5A) through a second air inlet 56, while flowing through the second side 57 it absorbs heat from the incoming relatively warm and humid inlet airflow 16.2 that flows in the first side of the heat exchanger 50. Airflow 17.2 leaves air-to-air heat exchanger 50 through outlet 58 as a relatively dry and warm airflow 17.3 (dryer relatively to airflow 16.2 and warmer relatively to airflow 17.2). In some embodiments, airflows 17.2 and 16.2 flow relatively to each other in a cross-flow, counter-flow or semi cross- semi counter-flow. The relatively warm and dry airflow 17.3 is directed by a flow diverting module 60 to be used in at least one out of various possible application, for example, to dry a vehicle's windshield 62 or to supply dry air to the engine's inlet manifold. The flow diverting module 60 may be consisted of various parts and components available in the art such as duct and nozzles to effectively apply the dry air into the specific application.

In some embodiments, the condenser 4 of the AWG 102.3 is located downstream the post-heated airflow 17.3 and upstream the channeling module 60 to further heat the airflow leaving the air-to-air heat exchanger 50, and assist in removing heat from the condenser for improved energy efficiency of the AWG 102.3 on one hand, and on the hand, providing warmer dry airflow for the application using dry air.

In some embodiments, the AWG comprises two air-to-air heat exchangers, each of them as described above. The two heat exchangers are coupled to at least one fan or blower adapted to allow two separate airflows to exchange heat with each other. The fan or blower is installed in the AWG such as to motivate a first relatively warm and humid first air stream to flow through a first side of a first air-to-air heat exchanger allowing heat exchange with a relatively cold second air stream flowing in a second side of the first air-to-air heat exchanger, then through an evaporator adapted to chill the first air stream and condense humidity therefrom, then through a second side of a second air-to-air heat exchanger adapted to allow heat exchange between the relatively cold and dry first air stream with a relatively warm and humid second air stream in the first side of the second air-to-air heat exchanger.

The same fan/blower or a separate fan/blower motivates a second relatively warm and humid air stream to flow through a first side of a second air-to-air heat exchanger adapted to allow heat exchange with the relatively cold and dry first air stream flowing in the second side of the second air-to-air heat exchanger, then through an evaporator adapted to chill the second air stream and condense humidity therefrom, then through a second side of a first air-to-air heat exchanger adapted to allow heat exchange between the relatively cold and dry second air flow with a relatively warm and humid first air flow in the first side of the first air-to-air heat exchanger.

In another aspect, the invention provides an apparatus having at least one of (i) a sensor that needs to be washed from time to time as well as a washer module for washing the sensor and (ii) a fuel cell; and an AWG system wherein the AWG system supplies water to the fuel cell and/or the washer module. To this end, a dispensing line is connected at one end to a storage tank of an AWG system as described in this invention or an AWG as known in the art, and at the other end to the fuel cell and/or the washer module. The dispensing line may comprise a water pump for motivating water from the storage tank to the fuel cell and/or the washer module. In some embodiments, a control unit of the AWG installed with a control module is in communication with a sensor able to detect shortage of water in the fuel cell and/or a sensor able to detect a need to wash the sensor. The control unit is designed to activate the dispensing line to supply water to the fuel cell and/or the washing module, respectively, in response to receiving a signal from the respective sensor indicating shortage of water or need of cleaning, respectively.

In another aspect, the invention provides a mechanism for storing cooling energy in an AWG which receives power from an auxiliary apparatus in which it is installed, or to which it is coupled while the apparatus is operating. The cooling energy that is stored can be used to enable the generation of water condensate and/or dehumidified air by the AWG while the main apparatus is turned off. To this end, the AWG comprises a phase change material (PCM) that is stored in a compartment which further comprises an evaporator and a heat exchanger both being in contact with the PCM.

The term "Phase change material (PCM)" refers to substances that absorb and release thermal energy during the process of melting and freezing, respectively. When a PCM freezes, it releases a large amount of energy in the form of latent heat at a relatively constant temperature. Conversely, when such material melts, it absorbs a large amount of heat from the environment at a relatively constant temperature. Water is an example for a change phase material. When water is cooled to its freezing point it solidifies and turns into ice, while releasing heat to the environment. When the environment has a higher temperature than the temperature of the ice, the ice absorbs heat from the environment, until it reaches its melting point and melts.

The evaporator in the PCM tank (the "PCM evaporator") is part of a refrigeration cycle receiving power from the apparatus (e.g. a vehicle) or connected thereto. As long as the refrigeration cycle receiving power from the apparatus is running, the PCM evaporator lowers the temperature of the PCM and solidifies the PCM in the PCM compartment. A first heat exchanger which is disposed in the PCM is connected to a heat exchange fluid circulating line. When the heat exchange fluid flows through the first heat exchanger, heat is transferred from the heat exchange fluid to the PCM through the first heat exchanger, to obtain cold heat exchange fluid which further flows to a second heat exchanger, in which heat is transferred from the air to the heat exchange fluid, cooling the air for generating water condensate. The heat exchange fluid then returns to the first heat exchanger to complete a closed cycle. In some embodiments the heat exchange fluid is selected from a group consisting of water, antifreeze and oil. In some embodiments the fluid may be water comprising an antifreeze (e.g. propylene glycol).

Figure 6:
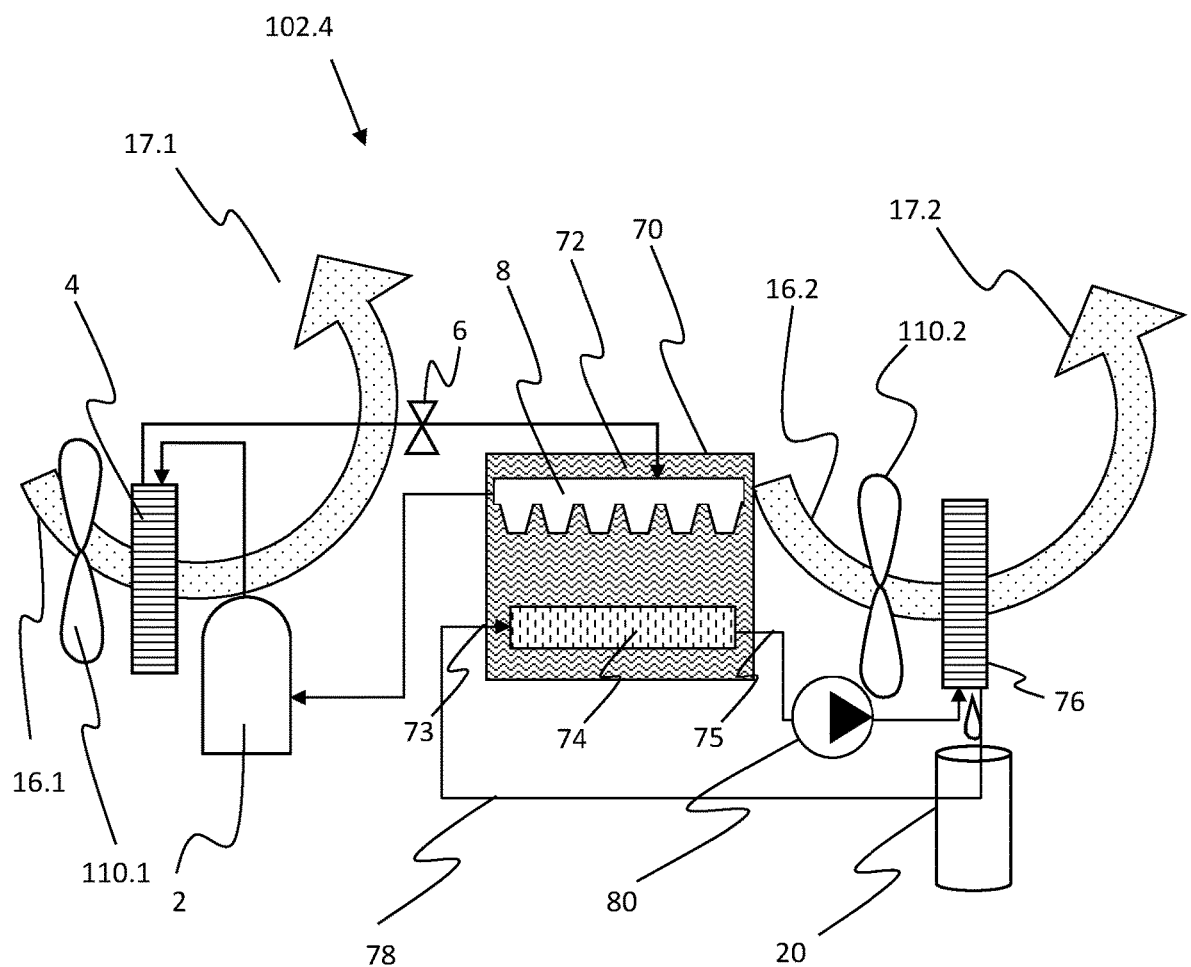
FIG. 6 is a block diagram of an AWG installed in an apparatus which provides power to the AWG while the apparatus is operating according to an embodiment of the present invention.

Reference is now made to FIG. 6 depicting an embodiment of an AWG 102.4 installed in a power providing apparatus such as a vehicle (not shown) and equipped with a PCM cooling battery according to an embodiment of the invention. Components which are the same as those corresponding parts in FIGS. 1 to 3 and 5 are denoted by the same reference numerals, and a description thereof will be omitted but should be construed as being identical.

The AWG 102.4 comprises a refrigeration cycle being powered by the apparatus (e.g. a vehicle) in which it is installed. The evaporator 8 of the refrigeration cycle is accommodated in a PCM compartment 70 which contains a PCM 72 and a first heat exchanger 74. The PCM 72 can be any material which changes phases from liquid to solid and in the range of temperatures between ambient temperature and a lower temperature which the evaporator can reach when the refrigeration cycle operates. The evaporator 8 is in contact with the PCM 72, solidifies at least some of the PCM 72 in the PCM tank 70 by absorbing heat from the PCM 72. The first heat exchanger 74 in the PCM tank 70 is adapted to transfer heat from the circulating fluid to the PCM 72 by being in contact with the surrounding PCM 72 and being in fluid communication with a second heat exchanger 76 in a closed loop 78 comprising a pump 80 for circulating a heat exchange fluid in the closed loop 78. In some embodiments the fluid may be water comprising an antifreeze (e.g. propylene glycol). In some embodiment, the fluid is a refrigerant and the first and second heat exchangers, together with the refrigerant and the refrigerant pipes form a heat pipe (in this case, pump 80 is not necessary).

The circulating heat exchange fluid enters the first heat exchanger 74 through an entry 73 and flows through the first heat exchanger 74 and exits through an outlet 75. When flowing through the first heat exchanger 74, the heat exchanger fluid is chilled by transferring heat to the PCM 72. The cooled fluid then flows to the second heat exchanger 76. A blower 110.2 is positioned such that it can blow air from outside the AWG 102.4 through the second heat exchanger 76, and the second heat exchanger is adapted to transfer heat from the airflow 16.2 to the heat exchange fluid and to cool the air below its dew point, creating water condensate. The heated fluid then returns to the first heat exchanger 74 to conclude a closed cycle. An optional storage tank 20 may be used to collect the water condensate that is generated and drips off from the second heat exchanger 76. The heat exchange fluid circulation loop 78 and the blower 110.2 may be powered by a secondary power source (not shown) providing power to the fluid circulation loop 78 when the apparatus power is off. When the apparatus is running, the fluid circulation loop 78 and blower 110.2 may obtain power from the main power source of the apparatus (e.g. the vehicle).

Figure 7:
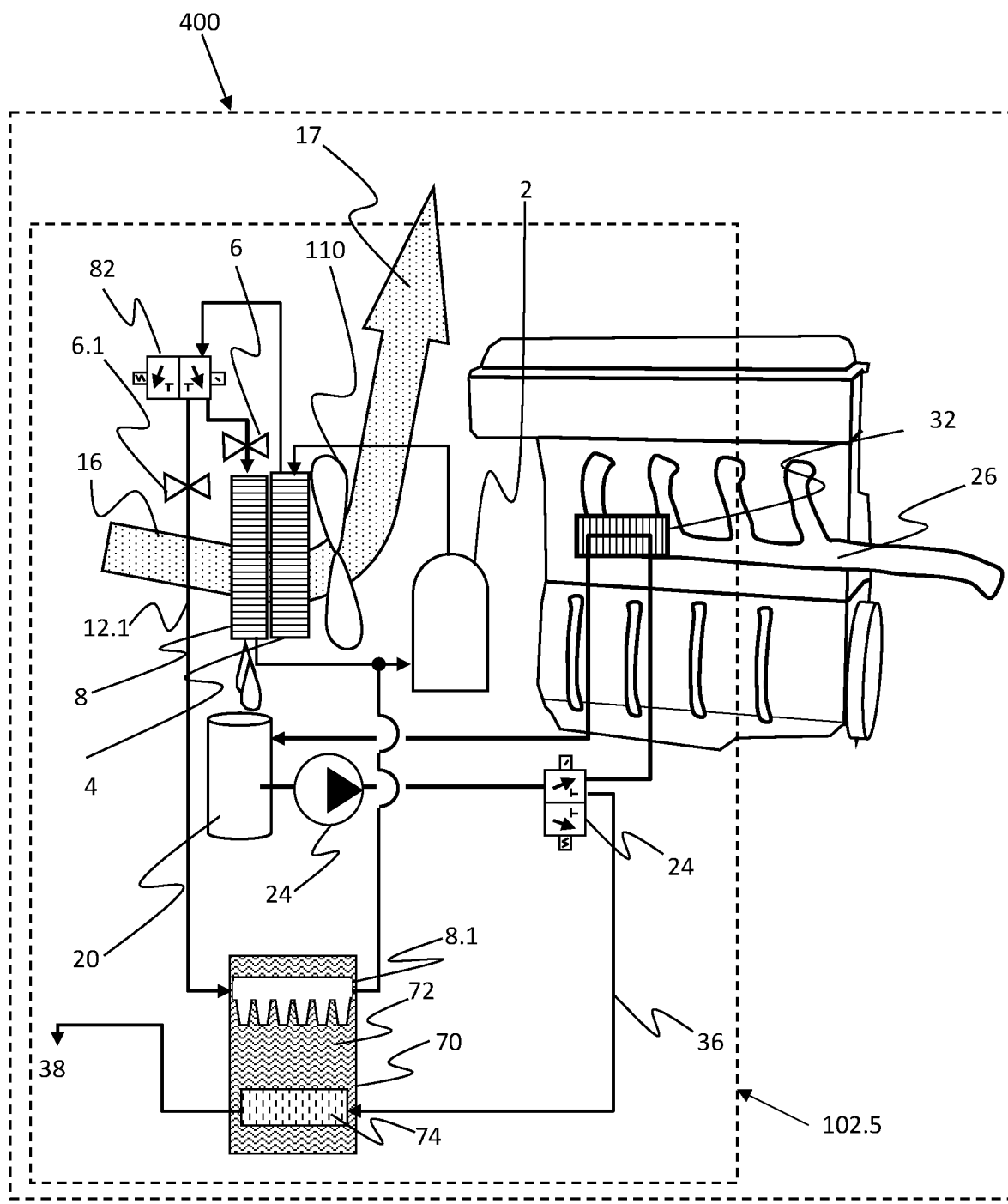
FIG. 7 is a block diagram of an AWG installed in an apparatus and equipped with a water cooling PCM compartment and a water heating circulation line according to an embodiment of the present invention.

Reference is now made to FIG. 7 depicting yet another embodiment of an AWG installed in an apparatus comprising a heat emitting element 400 according to the invention. Components which are the same as those corresponding parts in previous figures are denoted by the same reference numerals, and a description thereof will be omitted but should be construed as being identical.

The AWG is identical to the system depicted in FIG. 2 except for having a PCM tank for chilling the water in the dispensing line comprising a second evaporator 8.1 being in fluid communication with to the main refrigeration cycle 106, PCM 72 and PCM heat exchanger 74. The PCM heat exchanger 74 is in contact with the PCM 72 in the PCM tank 70 and is disposed on the dispensing line. In some embodiments the PCM heat exchanger is submerged in the PCM 72. The water passing through the PCM heat exchanger are chilled by transferring heat to the PCM material 72. A bidirectional valve 82, positioned downstream the condenser 4, has two states. In a first state it directs the refrigerant to expansion device 6 of the water condensation refrigeration cycle. In a second state it directs the refrigerant to an expansion device 6.1 upstream the evaporator 8.1 in the PCM tank 70. The refrigerant leaving the second evaporator 8.1 returns back to the compressor 2.

The bidirectional valve 82 is activated by a control unit (not shown) installed with a programmed module which responds to a predetermined logic and to indications from corresponding sensors regarding the water level in the storage tank 20 and the temperature of the PCM 72 in the PCM tank 70 for determining when to activated the water generation refrigeration cycle and when to activate the water chilling PCM tank refrigeration cycle according to. when the PCM is cold enough and the water storage tank is full it may turn the refrigeration cycle off. When the water level in the storage tank is lower than a predetermined value or when the PCM temperature is higher than a predefined threshold, the compressor is activated. Usually, the control system gives priority to cooling the PCM tank, and only then to condensate water, by turning the bidirectional valve 82 to divert the refrigerant toward the PCM cycle or toward water generating refrigeration cycle.

In some embodiments the PCM is ice, and at least a portion of which is derived from the water condensate.

Another difference between the AWG 102.5 in FIG. 7 and the AWGs in FIGS. 1 and 2 is that the presence of a water chilling PCM tank 70 moots the need for a pre-heating/post-cooling portion 31 in the heat exchanger 26 of the pasteurization cycle 22. In some embodiments the storage tank 20 is kept in a temperature above 60° C. When the control unit commands for water dispensing, bidirectional valve 24 diverts the water toward line 36, pump 24 is activated, and hot water from the storage tank flows through heat exchanger 74, being chilled, and dispensed through faucet 38.

Figure 8:
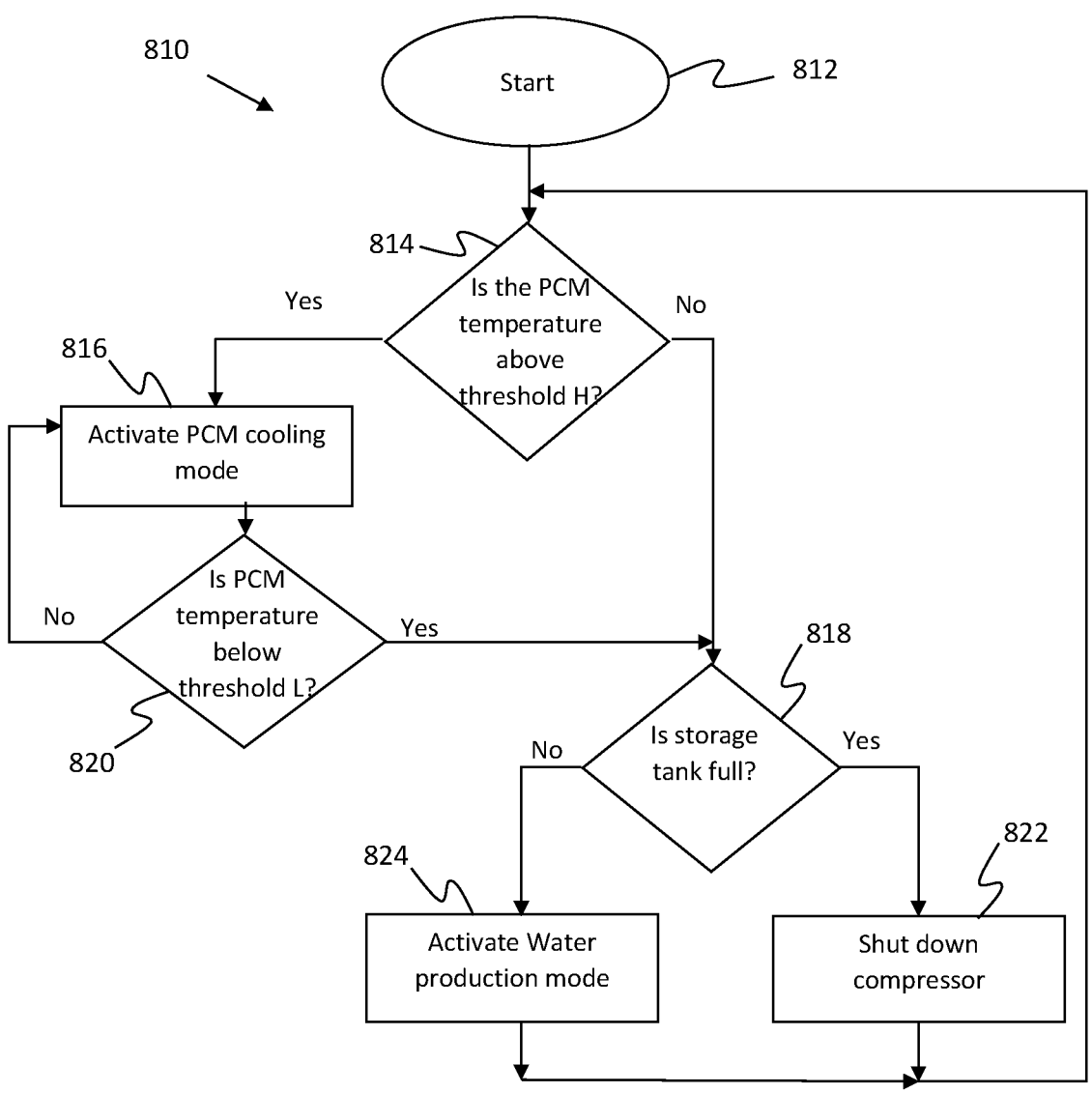
FIG. 8 is a flow chart depicting a method for operating the AWG equipped with a PCM compartment and a water heating circulation line which is installed in a heat producing apparatus or coupled thereto, according to an embodiment of the present invention.

Reference is now made to FIG. 8 describing the logic of operation of an AWG such as that described in FIGS. 6 and 7 comprising a PCM compartment, while the coupled apparatus which provides power to the AWG is operating (Algorithm 810).

In step 812 the logic starts wherein the PCM is at a given temperature measurable by a temperature sensor (e.g. thermometer, thermocouple) and the apparatus providing power to the AWG is running (turned on).

Conditioning step 814 describes a checkout to determine whether to turn on the PCM cooling mode or not. If the PCM temperature measured by the temperature sensor and provided to a control unit is above a predetermined threshold temperature H, then the answer is YES and the control unit operates a PCM cooling mode (i.e. the refrigeration cycle flows through the PCM evaporator 8 or 8.1 (step 816). If the PCM temperature measured by the temperature sensor and provided to the control unit is at or below the predetermined threshold temperature H, then the algorithm continues to the next conditional step 818. In some embodiments the threshold temperature H is the freezing point of the PCM.

After the PCM cooling mode is activated, then the algorithm 810 continues to the next conditional step 820, which describes a checkout to determine whether the PCM cooling mode needs to be terminated. If the PCM temperature as measured by the temperature sensor and provided to the control unit is below a predetermined threshold temperature L, then the answer is YES and the algorithm continues to conditional step 818. If it is above predetermined threshold temperature L then the answer is NO and the algorithm proceeds according to step 816 having the PCM cooling mode continued. In some embodiments, the threshold temperature L is 5° C., 10° C. or 15° C. lower than the freezing point of the PCM.

Conditional step 818 describes a checkout to determine whether the storage tank 20 is full. The indication whether the storage tank 20 is full may arrive from a detector capable of measuring the water level in the storage tank, and whether it has reached a predetermined level considered to indicate of a full storage tank. If the detector indicates that the storage tank is full then the answer is YES and the compressor 2 is shut down to save energy (step 822) and the algorithm returns to conditional step 814. In some embodiments, the system may be in a super production mode, so instead of saving energy, the compressor is kept running and the PCM cooling mode continues to lower the PCM temperature further. If indication is provided that the storage tank 20 is not full the answer is NO and the AWG system is switched to water production mode, in which the refrigerant is diverted to the water generation evaporator for producing more water (step 824). The algorithm then reverts to conditional step 814.

According to another aspect the invention is directed to a method of operating an AWG equipped with a PCM compartment following the steps of algorithm 810.

In another aspect the invention relates to an apparatus such as a vehicle comprising any one of the AWG systems of the invention as described above and comprising the necessary component for the AWG of the invention to operate (i.e. a heat emitting component, a power source, an element requiring drying or an element requiring water supply).

Following are Embodiments of the Invention

1. A vehicle comprising an atmospheric water generator (AWG) and at least one heat producing element,
    the AWG comprising
        a refrigeration cycle adapted to condense humidity from the air into water condensate
        and
        a pasteurization circulation system adapted to circulate the water condensate and transfer heat from the heat producing element of the vehicle to the circulating water condensate such that the circulating water condensate is heated to a temperature and duration rendering it pasteurized and adapted to post-cool the pasteurized water condensate.

2. The vehicle according to embodiment 1 wherein the heat producing element is at least one of: a combustion engine, an electrical engine, brakes system, and gasses exhaust.
3. The vehicle according to embodiment 1 wherein the refrigeration cycle comprises an evaporator, a condenser, a compressor, expansion means, a blower, a water condensate storage tank adapted to collect and store the water condensate, and refrigerant tubes, the blower being designed to motivate air from outside the AWG through the evaporator, the evaporator being colder than the air dew point and the water condensate storage tank designed to collect the water condensate.
4. The vehicle according to embodiment 1 wherein the pasteurization circulation system comprises a circulation line, a water pump for motivating the water condensate in the circulation line.
5. The vehicle according to embodiment 1 wherein the pasteurization circulation system comprises at least one heat exchanger designed to transfer heat from the heat producing element of the vehicle to the circulating water condensate such that the circulating water condensate is heated to a temperature and duration rendering it pasteurized and adapted to post-cool the pasteurized water condensate.
6. The vehicle according to embodiment 5 wherein the heat exchanger comprises a first portion and a second portion, the first portion comprising two sides separated by a barrier, each side having an inlet and an outlet and is adapted to enable heat exchange between cold water flowing in the pre-heating side of the first portion before entering the second portion and hot water exiting the second portion and flowing in the second side of the first portion, the second portion comprising an inlet and an outlet and is contact with the heat producing element of the vehicle.
7. The vehicle according to embodiment 6 wherein the pasteurization circulation line is configured to circulate cold water from the outlet of the storage tank to the inlet of the pre-heating side of the first portion of the heat exchanger, where it is warmed by exchanging heat with hot water in the second side of the first portion of the heat exchanger then exits the outlet of the pre-heating side of the first portion of the heat exchanger, the warmed water enters the second portion of the heat exchanger, where the warmed water is heated by exchanging heat with the heat producing element of the vehicle, such that the heated water is disinfected, the hot water then exits the second portion of the heat exchanger and enters the second side of the first portion of the heat exchanger where the hot water is cooled by exchanging heat with the cold water in the first side of the first portion of the heat exchanger, exits the first portion of the heat exchanger and returns to the water condensate storage tank.
8. The vehicle according to embodiment 6 wherein the water exiting the second portion of the heat exchanger is pasteurized.
9. The vehicle according to embodiment 6 comprising a pump located upstream the heat exchanger enabling pressure higher than 1.5 bar in the heat exchanger and a pressure drop means located downstream the heat exchanger.
10. The vehicle according to embodiment 9 wherein the water in the heating element reaches a temperature for a duration meeting high temperature short time (HTST) pasteurization standards.
11. The vehicle according to embodiment 7 wherein the circulation line passes in vicinity to the evaporator located downstream the second portion of the heat exchanger, designed to cool the water exiting the second portion of the heat exchanger, before exiting the pasteurization circulation line.
12. The vehicle according to embodiment 9, wherein a directional valve is located downstream the circulation pump, the valve comprising at least two states: in a first state, the bi-directional valve directs the water from the pump outlet toward the rest of the circulation line and in the second state, directs the water from the pump outlet toward dispensing means.
13. A vehicle comprising an atmospheric water generator (AWG),
the AWG comprising
a refrigeration cycle adapted to condense humidity from the air into water condensate, a control unit, a detachable receptacle adapted to receive water condensate generated and transferred by the refrigeration cycle, and a presence sensor adapted to sense the presence or absence of the detachable receptacle
wherein
the control unit being in communication with the presence sensor, and designed to stop the transfer of water condensate to the detachable receptacle upon receiving a signal from the presence sensor of absence of the detachable receptacle, and to activate transfer of water condensate to the detachable receptacle upon receiving a signal from the presence sensor of presence of the detachable receptacle.
14. The vehicle according to embodiment 13 wherein the detachable water receptacle is selected from a collection tank and a bottle.
15. The vehicle according to embodiment 13 further comprising a water condensate storage tank designed to collect the water condensate comprising an outlet spout, the outlet spout being connected to the detachable receptacle and the activation and deactivation of the condensate water by the control unit is by opening and closing the spout, respectively.
16. The vehicle according to embodiment 13 wherein the presence sensor is selected from a proximity sensor, weight sensor, touch switch, and an occupancy sensor.
17. The vehicle according to embodiment 13 wherein the water condensate storage tank is a detachable bottle.
18. A vehicle comprising an atmospheric water generator (AWG) adapted to provide relatively warm and dry air and at least one of a motor, a windshield, side mirrors and a sensor,
the AWG comprising
a refrigeration cycle adapted to dehumidify relatively warm and humid incoming air into relatively dry and cold outgoing air, and coupled to at least one air-to-air heat exchanger adapted to mutually pre-cool the incoming humid air and post-heat the outgoing dry air,
wherein
the post-heated dry air is channeled to a module adapted to at least one of: a) provide dry air to the motor suction; b) dry the windshield; c) dry water condensation over the sensor; and d) expel the humidity of a passengers' compartment.
19. The vehicle according to embodiment 18 wherein the air-to-air heat exchanger comprises a first side and a second side, the two sides separated by a barrier, each side having an inlet and an outlet,
wherein the AWG is adapted to motivate air
from outside the AWG through the first side of the air-to-air heat exchanger allowing the air to transfer heat to air in the second side of an air-to-air heat exchanger,
then through the outlet of the first side of the air-to-air heat exchanger to an evaporator of the refrigeration cycle, the evaporator adapted to be colder than the air dew point to condense at least some of the humidity of the air coming in contact with the evaporator into water condensate, such that air exiting the AWG is dryer and colder than air entering the evaporator,
then through a second side of an air-to-air heat exchanger where the air is allowed to receive heat from the air in a first side of an air-to-air heat exchanger.

20. The vehicle according to embodiment 18 comprising two air-to-air heat exchangers adapted to allow
a relatively warm and humid first air stream to flow through a first side of a first air-to-air heat exchanger allowing heat exchange with a relatively cold second air stream in a second side of the first air-to-air heat exchanger,
then through an evaporator adapted to chill the first air stream and condense humidity therefrom,
then through a second side of a second air-to-air heat exchanger adapted to allow heat exchange between the relatively cold and dry first air stream with a relatively warm and humid second air stream in the first side of the second air-to-air heat exchanger,
and adapted to allow
a second relatively warm and humid air stream to flow through a first side of a second air-to-air heat exchanger adapted to allow heat exchange with a relatively cold and dry first air stream,
then through an evaporator adapted to chill the second air stream and condense humidity therefrom,
then through a second side of a first air-to-air heat exchanger adapted to allow heat exchange between the relatively cold and dry second air flow with a relatively warm and humid first air flow in the first side of the first air-to-air heat exchanger.

21. The vehicle according to embodiment 18 further comprising a collection tank designed to collect the water condensate.

22. The vehicle according to embodiment 18, wherein a condenser of the AWG is located downstream the post-heated air and upstream the channeling module.

23. A vehicle comprising an atmospheric water generator (AWG) and at least one of a fuel cell and a sensor washer,
the AWG comprising
a refrigeration cycle adapted to condense humidity from the air into water condensate, and a dispensing line adapted to provide water condensate to at least one of the fuel cell and the sensor washer.

24. A vehicle, comprising an atmospheric water generator (AWG) and at least one power source,
the AWG comprising:
a PCM tank adapted to contain a PCM,
a refrigeration cycle powered by the vehicle power source, the refrigeration cycle comprising an evaporator accommodated in the PCM tank and adapted to absorb heat from a phase change material (PCM) contained in the PCM tank,
a first heat exchanger,
a second heat exchanger,
a blower, and
a water condensate storage tank
wherein, the evaporator is adapted to solidify the PCM in the PCM tank,
the pump is adapted to circulate fluid from within the first heat exchanger to the second heat exchanger and from the second heat exchanger to the first heat exchanger in a closed loop,
the first heat exchanger is adapted to transfer heat from the circulating fluid to the the PCM in the PCM tank,
the blower is adapted to blow an airflow, from outside the AWG, through the second heat exchanger,
the second heat exchanger is adapted to transfer heat from the airflow to the fluid and to cool the air below its dew point, creating water condensation.

25. The vehicle according to embodiment 24 wherein the PCM is water.

26. The vehicle according to embodiment 25 wherein at least some of the water in the PCM tank is produced by the AWG.

27. The vehicle according to embodiment 24, wherein the AWG comprises a secondary power source, providing power to the AWG when the vehicle power is off.

28. A vehicle comprising an atmospheric water generator (AWG),
the AWG comprising
a refrigeration cycle receiving power from a power source of the vehicle, adapted to chill an air stream and condense humidity therefrom into water condensate comprising a storage tank adapted to store the generates water condensate,
a circulation line connected to the storage tank comprising a first heat exchanger adapted to heat the water circulated in the circulation line by the vehicle's heat source and a circulating pump adapted to circulate the water from the storage tank, through the first heat exchanger and from the first heat exchanger to the storage tank, and
a dispensing line comprising a pump, a second heat exchanger and a spout, connected at one end to the water condensate storage tank and the spout located at the second end, the second heat exchanger located between the water condensation storage tank and the spout and
a phase change material (PCM) compartment adapted to accommodate a PCM, at least a portion of a second evaporator and at least a portion of the second heat exchanger of the dispensing line comprising,
a second evaporator and
a second heat exchanger
wherein
the second evaporator being connected to the refrigeration cycle, located downstream an expansion valve at a location allowing it to be in contact with the PCM in the PCM compartment, and adapted to cool and solidify the PCM,
the dispensing pump in the dispensing line is adapted to motivate water from the storage tank, to the second heat exchanger, then to the spout,
the second heat exchanger being located at a location allowing it to be in contact with the PCM in the PCM compartment, and adapted to cool the water by allowing heat transfer from the water to the PCM.

29. The vehicle according to embodiment 28 wherein the storage tank is connected to an outlet line, the outlet line comprises a water pump and a directional valve located downstream the pump, wherein in a first state of the directional valve is adapted to direct the water to the dispensing line and a second state is adapted to direct the water to the circulation line.

30. The vehicle according to embodiment 28 wherein the refrigeration cycle comprises a directional valve located downstream a condenser having a first state adapted to direct a refrigerant toward the first evaporator, allowing water condensation, and a second state adapted to direct the refrigerant to the second heat exchanger, allowing PCM to solidify.

31. The vehicle according to embodiment 28 wherein the storage tank is kept in a temperature above 60° C.

32. The vehicle according to embodiment 28 comprising a temperature sensor and a control unit, wherein a temperature sensor is adapted to indicate the temperature in the storage tank to a control unit, and the control unit is adapted to activate the circulation when the temperature in the storage tank is below a predetermined threshold and deactivate the circulation when the temperature in the storage tank is above a predetermined threshold.

33. of The vehicle according to embodiment 28 wherein the PCM is ice, wherein at least a portion of which is derived from the water condensate.

34. An AWG as defined in any one embodiments 1 to 33 to be installed in an apparatus or coupled thereto.

35. The AWG according to embodiment 34 wherein the apparatus is a vehicle.

The invention claimed is:

1. A vehicle comprising an atmospheric water generator (AWG) and at least one heat producing element,
the AWG comprising:
a refrigeration cycle adapted to condense humidity from the air into water condensate, and
a pasteurization circulation system adapted to circulate the water condensate and transfer heat from the heat producing element of the vehicle to the circulating water condensate such that the circulating water condensate is heated to a temperature and duration rendering it pasteurized and adapted to post-cool the pasteurized water condensate,
wherein the pasteurization circulation system comprises at least one heat exchanger designed to transfer heat from the heat producing element of the vehicle to the circulating water condensate such that the circulating water condensate is heated to a temperature and duration rendering it pasteurized and adapted to post-cool the pasteurized water condensate, and
wherein the heat exchanger comprises a first portion and a second portion, the first portion comprising two sides separated by a barrier, each side having an inlet and an outlet and being adapted to enable heat exchange between cold water flowing in the pre-heating side of the first portion before entering the second portion and hot water exiting the second portion and flowing in the second side of the first portion, the second portion comprising an inlet and an outlet and is in contact with the heat producing element of the vehicle.

2. The vehicle according to claim 1 wherein the heat producing element is at least one of: a combustion engine, an electrical engine, brakes system, and gasses exhaust.

3. The vehicle according to claim 1 wherein the refrigeration cycle comprises an evaporator, a condenser, a compressor, expansion means, a blower, a water condensate storage tank adapted to collect and store the water condensate, and refrigerant tubes,
the blower being designed to motivate air from outside the AWG through the evaporator, the evaporator being colder than the air dew point and the water condensate storage tank designed to collect the water condensate.

4. The vehicle according to claim 1, wherein the pasteurization circulation system comprises a circulation line, and a water pump for motivating the water condensate in the circulation line.

5. The vehicle according to claim 1 wherein the pasteurization circulation line is configured to circulate cold water from the outlet of the storage tank to the inlet of the pre-heating side of the first portion of the heat exchanger, where it is warmed by exchanging heat with hot water in the second side of the first portion of the heat exchanger then exits the outlet of the pre-heating side of the first portion of the heat exchanger, the warmed water enters the second portion of the heat exchanger, where the warmed water is heated by exchanging heat with the heat producing element of the vehicle, such that the heated water is disinfected, the hot water then exits the second portion of the heat exchanger and enters the second side of the first portion of the heat exchanger where the hot water is cooled by exchanging heat with the cold water in the first side of the first portion of the heat exchanger, exits the first portion of the heat exchanger and returns to the water condensate storage tank.

6. The vehicle according to claim 1 wherein the water exiting the second portion of the heat exchanger is pasteurized.

7. The vehicle according to claim 1 comprising a pump located upstream of the heat exchanger enabling pressure higher than 1.5 bar in the heat exchanger and a pressure drop means located downstream of the heat exchanger.

8. The vehicle according to claim 7 wherein the water in the heating element reaches a temperature for a duration meeting high temperature short time (HTST) pasteurization standards.

9. A vehicle comprising an atmospheric water generator (AWG) adapted to provide relatively warm and dry air and at least one of a motor, a windshield, side mirrors and a sensor,
the AWG comprising:
a refrigeration cycle adapted to dehumidify relatively warm and humid incoming air into relatively dry and cold outgoing air, and coupled to at least one air-to-air heat exchanger adapted to mutually pre-cool the incoming humid air and post-heat the outgoing dry air,
wherein the post-heated dry air is channeled to a module adapted to at least one of: a) provide dry air to the motor suction; b) dry the windshield; c) dry water condensation over the sensor; and d) expel the humidity of a passengers' compartment, and
wherein the air-to-air heat exchanger comprises a first side and a second side, the two sides separated by a barrier, each side having an inlet and an outlet,
wherein the AWG is adapted to motivate air from outside the AWG
through the first side of the air-to-air heat exchanger allowing the air to transfer heat to air in the second side of an air-to-air heat exchanger,
then through the outlet of the first side of the air-to-air heat exchanger to an evaporator of the refrigeration cycle, the evaporator adapted to be colder than the air dew point to condense at least some of the humidity of the air coming in contact with the evaporator into water condensate, such that air exiting the AWG is dryer and colder than air entering the evaporator,
then through a second side of an air-to-air heat exchanger where the air is allowed to receive heat from the air in a first side of an air-to-air heat exchanger.

10. The vehicle according to claim 9 further comprising a collection tank designed to collect the water condensate.

11. The vehicle according to claim 9, wherein a condenser of the AWG is located downstream the post-heated air and upstream the channeling module.

* * * * *